United States Patent
Nojima (10) Patent No.: US 9,761,013 B2
(45) Date of Patent: Sep. 12, 2017

(54) INFORMATION NOTIFICATION APPARATUS THAT NOTIFIES INFORMATION OF MOTION OF A SUBJECT

(71) Applicant: CASIO COMPUTER CO., LTD., Shibuya-ku, Tokyo (JP)

(72) Inventor: Osamu Nojima, Tokyo (JP)

(73) Assignee: CASIO COMPUTER CO., LTD., Tokyo (JP)

(*) Notice: Subject to any disclaimer, the term of this patent is extended or adjusted under 35 U.S.C. 154(b) by 224 days.

(21) Appl. No.: 14/134,729

(22) Filed: Dec. 19, 2013

(65) Prior Publication Data
US 2014/0177926 A1 Jun. 26, 2014

(30) Foreign Application Priority Data
Dec. 21, 2012 (JP) .................................. 2012-280126

(51) Int. Cl.
*G06K 9/00* (2006.01)
*G06T 7/246* (2017.01)

(52) U.S. Cl.
CPC .... *G06T 7/246* (2017.01); *G06T 2207/10016* (2013.01); *G06T 2207/30221* (2013.01); *G06T 2207/30241* (2013.01)

(58) Field of Classification Search
CPC .... G06K 9/00342; G06K 9/2081; G06T 7/20; G06T 7/004; G06T 2207/30196; G06T 2207/30241; G06T 2207/30221
See application file for complete search history.

(56) References Cited

U.S. PATENT DOCUMENTS 5,904,484 A * 5/1999 Burns ........................... 434/252
8,903,521 B2 * 12/2014 Goree et al. .................. 700/90
2002/0114493 A1 * 8/2002 McNitt et al. ................ 382/107
2005/0215336 A1 * 9/2005 Ueda et al. ................... 473/131
2006/0045312 A1 * 3/2006 Bernstein et al. ............ 382/103
2009/0208061 A1 * 8/2009 Matsumoto et al. ......... 382/107
2011/0299729 A1 * 12/2011 Dawe et al. .................. 382/103

FOREIGN PATENT DOCUMENTS

| JP | 2002223405 A | 8/2002 | |
| JP | 2004-321767 A | 11/2004 | |
| JP | 2005339100 A | 12/2005 | |
| WO | 2008023250 A1 | 2/2008 | |
| WO | WO 2008023250 | * 2/2008 | ............. G09B 19/00 |

OTHER PUBLICATIONS

Japanese Office Action dated Feb. 10, 2015, issued in counterpart Japanese Application No. 2012-280126.

* cited by examiner

*Primary Examiner* — Vu Le
*Assistant Examiner* — Guillermo Rivera-Martinez
(74) *Attorney, Agent, or Firm* — Holtz, Holtz & Volek PC

(57) ABSTRACT

An information notification apparatus (1) includes: an image acquisition unit (42) that acquires a plurality of moving images in which motions of subjects are captured, respectively; a first detection unit (44) that detects a specific state in the motions of the subject from respective moving images among the plurality of moving images acquired by the acquisition unit; a face detection unit (45) that detects an image corresponding to the specific state detected by the first detection unit from the respective moving images; a comparison unit (47) that compares images detected by the image detection unit; and a notification control unit (50) that notifies information based on a comparison result by the comparison unit.

19 Claims, 9 Drawing Sheets

INFORMATION NOTIFICATION APPARATUS THAT NOTIFIES INFORMATION OF MOTION OF A SUBJECT

This application is based on and claims the benefit of priority from Japanese Patent Application No. 2012-280126, filed on 21 Dec. 2012, the content of which is incorporated herein by reference.

BACKGROUND OF THE INVENTION

Field of the Invention

The present invention relates to an information notification apparatus that notifies information of a motion of a subject, an information notification method, and a storage medium.

Related Art

Japanese Unexamined Patent Application, Publication No. 2004-321767 discloses a technology whereby an external apparatus is provided so that the apparatus faces a user across a golf ball for checking a user's motion of a golf swing as a conventional technology.

SUMMARY OF THE INVENTION

An apparatus according to a first aspect of the present application is an information notification apparatus including: an acquisition unit that acquires a plurality of moving images in which motions of subjects are captured, respectively; a state detection unit that detects specific states of the motions of the subjects from respective moving images among the plurality of acquired moving images; an image detection unit that detects images corresponding to the respective detected specific states from the moving images; a comparison unit that compares the detected images; and a notification control unit that notifies information based on a comparison result by the comparison unit. A method according to a second aspect of the present application is a method executed by an information notification apparatus, the method including: an acquisition step of acquiring a plurality of moving images in which motions of subjects are captured, respectively; a state detection step of detecting specific states of the motions of the subjects from respective moving images among the plurality of acquired moving images; an image detection step of detecting images corresponding to the respective detected specific states from the moving images; a comparison step of comparing the detected images; and a notification control step of notifying information based on a comparison result by the comparison unit. A non-transitory storage medium according to a third aspect of the present application is a non-transitory storage medium encoded with a computer-readable program that enables a computer to execute functions as: an acquisition unit that acquires a plurality of moving images in which motions of subjects are captured, respectively; a state detection unit that detects specific states of the motions of the subjects from respective moving images among the plurality of acquired moving images; an image detection unit that detects images corresponding to the respective detected specific states from the moving images; a comparison unit that compares between the detected images; and a notification control unit that notifies information based on a comparison result by the comparison unit.

DETAILED DESCRIPTION OF THE INVENTION

Figure 1:
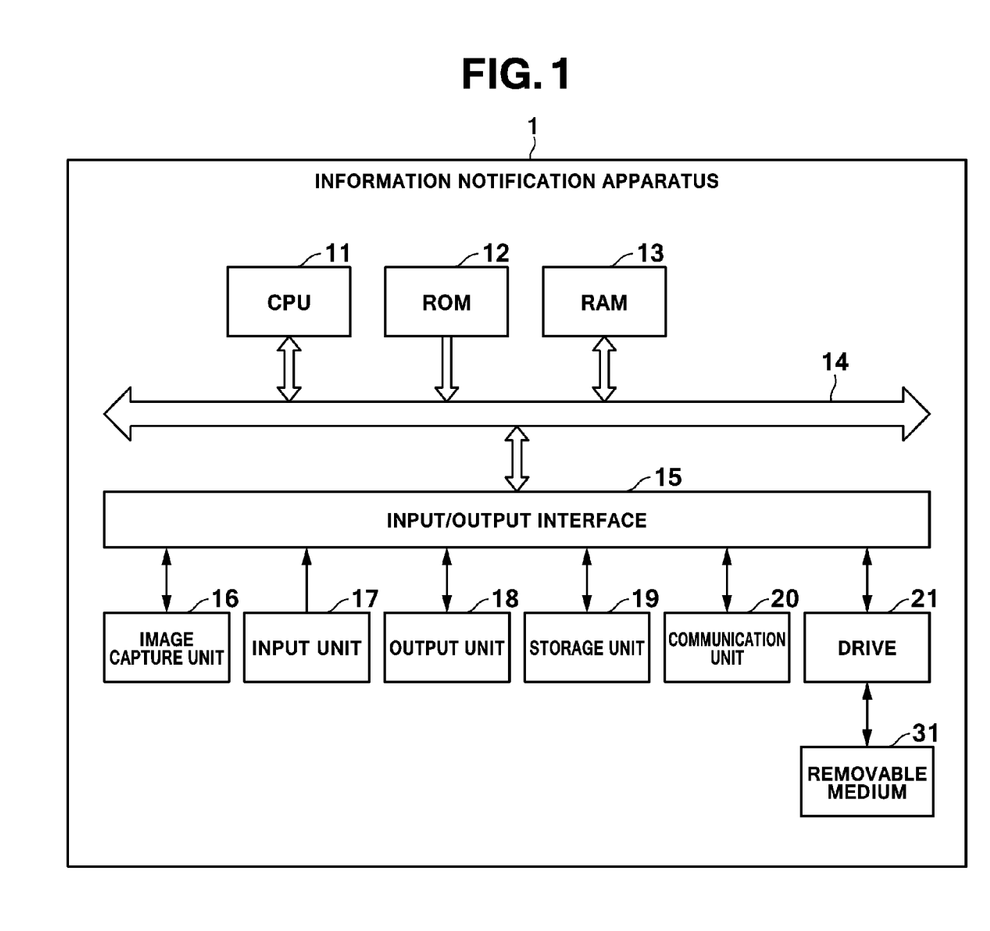
FIG. 1 is a block diagram showing a hardware configuration of an information notification apparatus 1 according to an embodiment of the present invention.

In the following, embodiments of the present invention are explained with reference to the drawings.
Configuration FIG. 1 is a block diagram showing a hardware configuration of an information notification apparatus according to an embodiment of the present invention.

The information notification apparatus 1 is configured as, for example, a digital camera.

The information notification apparatus 1 includes a CPU (Central Processing Unit) 11, ROM (Read Only Memory) 12, RAM (Random Access Memory) 13, a bus 14, an Input/Output interface 15, an image capture unit 16, an input unit 17, an output unit 18, a storage unit 19, a communication unit 20, and a drive 21.

The CPU 11 executes various processing according to programs that are recorded in the ROM 12, or programs that are loaded from the storage unit 19 to the RAM 13.

The RAM 13 also stores data and the like necessary for the CPU 11 to execute the various processing, as appropriate.

The CPU 11, the ROM 12 and the RAM 13 are connected to one another via the bus 14. The input/output interface 15 is also connected to the bus 14. The image capture unit 16, the input unit 17, the output unit 18, the storage unit 19, the communication unit 20, and the drive 21 are connected to the input/output interface 15.

The image capture unit 16 includes an optical lens unit and an image sensor (not illustrated).

In order to photograph a subject, the optical lens unit is configured by a lens such as a focus lens and a zoom lens for condensing light.

The focus lens is a lens for forming an image of a subject on the light receiving surface of the image sensor. The zoom lens is a lens that causes the focal length to freely change in a certain range.

The optical lens unit also includes peripheral circuits to adjust setting parameters such as focus, exposure, white balance, and the like, as necessary.

The image sensor is configured by an optoelectronic conversion device, an AFE (Analog Front End), and the like.

The optoelectronic conversion device is configured by a CMOS (Complementary Metal Oxide Semiconductor) type of optoelectronic conversion device and the like, for example. Light incident through the optical lens unit forms an image of a subject in the optoelectronic conversion device. The optoelectronic conversion device optoelectronically converts (i.e. captures) the image of the subject, accumulates the resultant image signal for a predetermined time interval, and sequentially supplies the image signal as an analog signal to the AFE.

The AFE executes a variety of signal processing such as A/D (Analog/Digital) conversion processing of the analog signal. The variety of signal processing generates a digital signal that is output as an output signal from the image capture unit 16.

Such an output signal of the image capture unit 16 is hereinafter referred to as "data of a captured image". Data of a captured image is supplied to the CPU 11, RAM 13, etc. as appropriate.

Here, in the present embodiment, data of a single captured image is sequentially output every 1/30 seconds, for example, to constitute data of a moving image. In other words, in the following, a captured image refers to, unless otherwise noted, a unit image (a frame, a field image, etc.) constituting a moving image.

The input unit 17 is configured by various buttons and inputs a variety of information in accordance with instruction operations by the user.

The output unit 18 is configured by the display unit, a speaker, and the like, and outputs images and sound.

The storage unit 19 is configured by DRAM (Dynamic Random Access Memory) or the like, and stores data of various images.

The communication unit 20 controls communication with other devices (not shown) via networks including the Internet.

A removable medium 31 composed of a magnetic disk, an optical disk, a magneto-optical disk, semiconductor memory or the like is installed in the drive 21, as appropriate. Programs that are read via the drive 21 from the removable medium 31 are installed in the storage unit 19, as necessary. Similarly to the storage unit 19, the removable medium 31 can also store a variety of data such as the image data stored in the storage unit 19.

Figure 2:
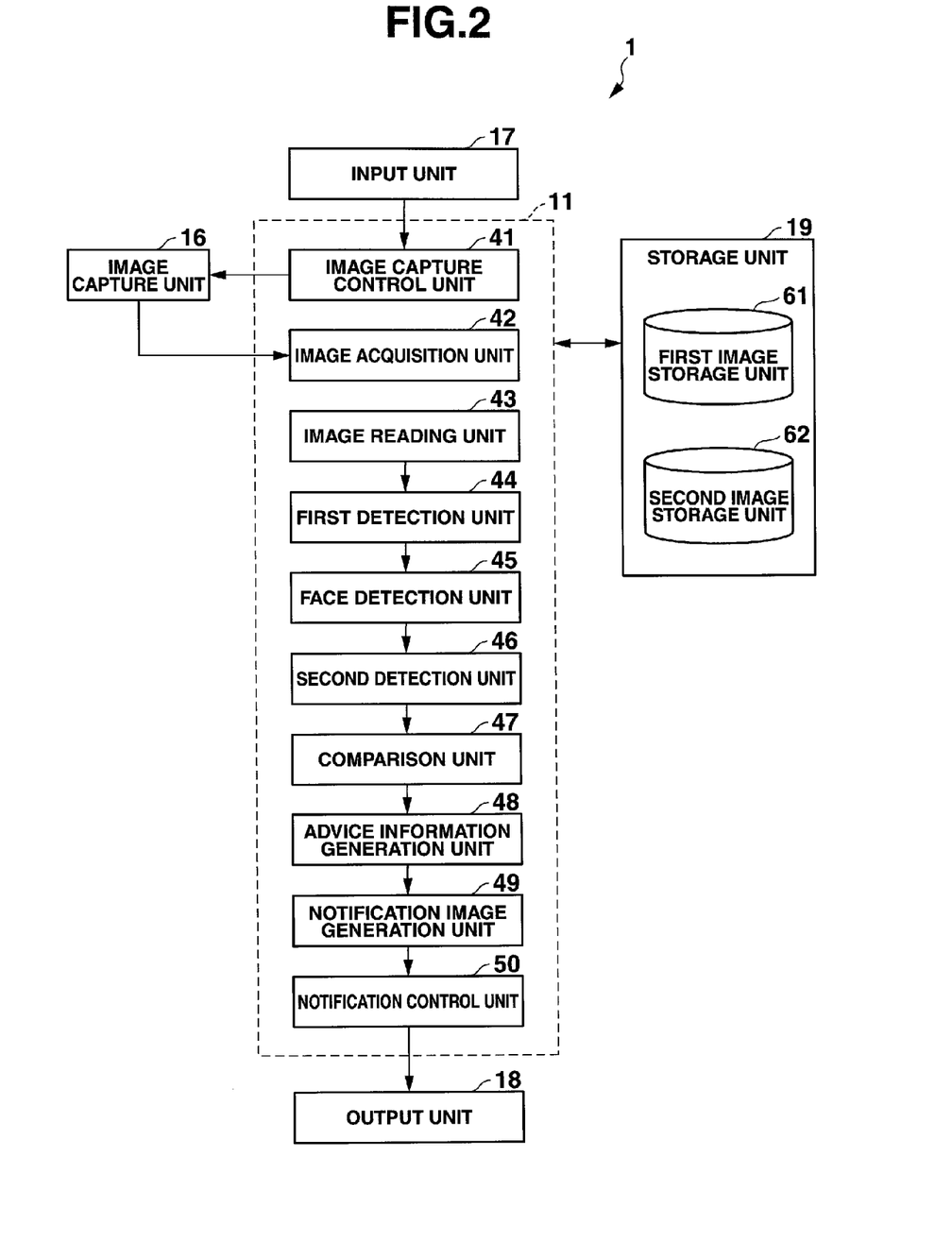
FIG. 2 is a functional block diagram showing a functional configuration for executing comparison result notification processing, among the functional configurations of the information notification apparatus 1 in FIG. 1.

FIG. 2 is a functional block diagram showing a functional configuration for executing notification processing, among the functional configurations of such an information notification apparatus 1.

The notification processing refers to a sequence of processing of comparing an analysis result of motions of a subject included in moving images captured with an analysis result of motions such as of a person as a target for comparison, and generating and notifying information based on the result thus compared.

In the present embodiment, an example is explained of comparing information based on an analysis result of a golf swing of a player (hereinafter, referred to as "an analysis result from a player") included in a moving image captured by the information notification apparatus 1 with information based on an analysis result of a golf swing of a professional golfer (hereinafter, referred to as "an analysis result of a professional golfer") included in moving image data captured by the information notification apparatus 1. However, a variety of information can also be compared such as comparing information based on an analysis result of a recent golf swing of a player included in a moving image captured by the data comparison apparatus 1 with information based on an analysis result of a golf swing of the player included in a moving image captured in the past.

When the notification processing is executed, as shown in FIG. 2, an image capture control unit 41, an image acquisition unit 42, an image reading unit 43, a first detection unit 44, a face detection unit 45, a second detection unit 46, a comparison unit 47, an advice information generation unit 48, a notification image generation unit 49, and a notification control unit 50 function in the CPU 11.

However, FIG. 2 is merely an example, and at least a part of the functions of the CPU 11 may be imparted to hardware that performs image processing such as a GA (Graphics Accelerator).

When the notification processing is executed, a first image storage unit 61 and a second data storage unit 62 which are provided as areas of the storage unit 19 are used.

In the image storage unit 61, a moving image (a plurality of captured images) that is output from the first image capture unit 16 and acquired by the image acquisition unit 42 is stored.

In the second image storage unit 62, a moving image of a golf swing of a professional golfer is stored in advance.

The image capture control unit 41 sets various image capture conditions inputted via the input unit 17 and controls the operation of image capture at the image capture unit 16.

In the present embodiment, in order to capture a subject (player) who makes a sequence of motions, the image capture control unit 41 causes the image capture unit 16 to capture the subject continuously and outputs as data of a moving image.

The image acquisition unit 42 acquires data of a moving image output from the image capture unit 16. Then, the image acquisition unit 42 encodes data of a moving image and stores in the first image storage unit 61.

The image reading unit 43 reads data of a moving image of a player stored in the first image storage unit 61 and data of a moving image of a professional golfer stored in the second image storage unit 62. In other words, the image reading unit 43 sequentially decodes data of a moving image stored in the first image storage unit 61 and the second image storage unit 62 with each captured image as a unit image and stores data of a sequence of captured images thus decoded in the RAM 13.

Figure 4:
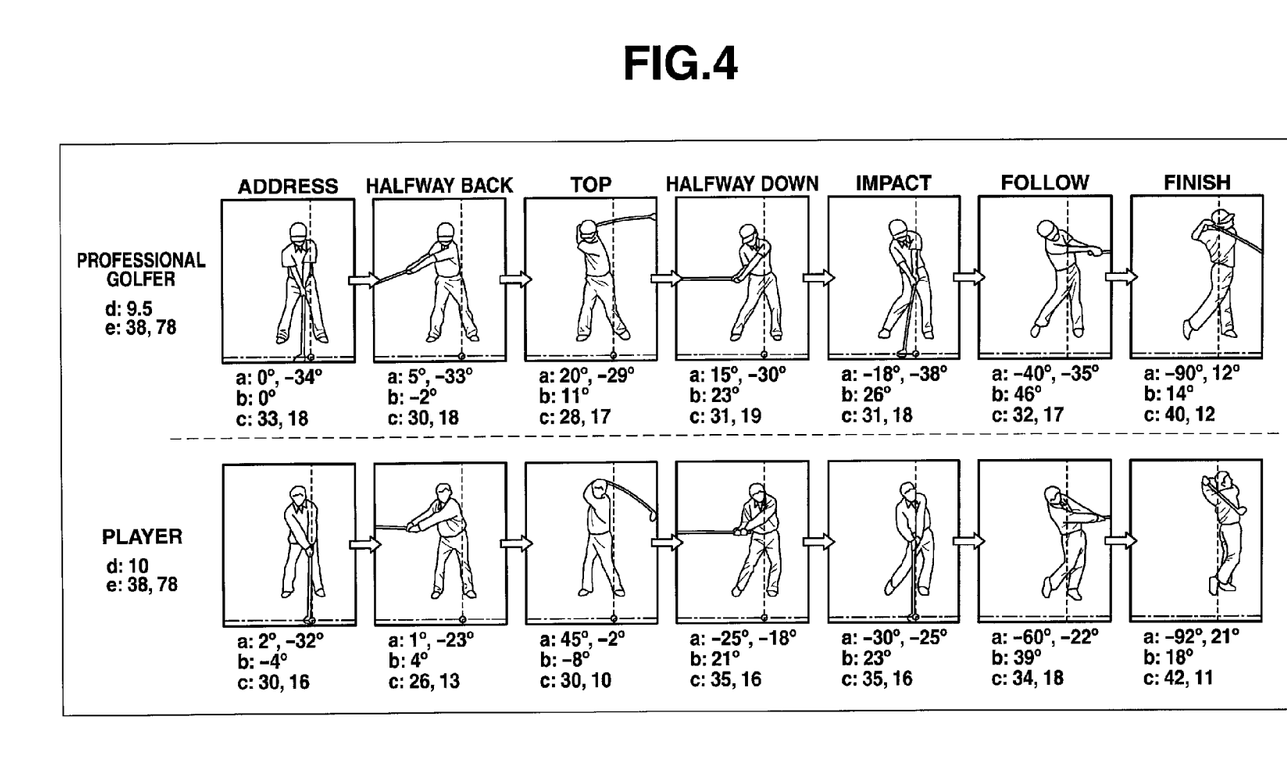
FIG. 4 is a diagram showing a positions and the like of face images for the player and the professional golfer for each of the seven specific swing state images.

The first detection unit 44 detects, for each of a player and professional golfer, an image of a specific swing state based on the data of the moving image of the player and the data of the moving image of the professional golfer read by the image reading unit 43. Here, the specific swing state refers to the seven states of "address" state, "halfway back" state, "halfway down" state, "top" state, "impact" state, "follow" state, and "finish" state, as shown in FIG. 4 described later.

More specifically, the first detection unit 44 extracts image data of a shaft part of a golf club based on the player's moving image data and the professional golfer's moving image data. Furthermore, the first detection unit 44 executes Hough transform based on the image data extracted and detects an angle made by a horizontal plane of the shaft part of the golf club based on a result of the execution. Moreover, the first detection unit 44 detects, for each of the player and the professional golfer, images of the abovementioned seven specific swing states based on the angle detected.

Furthermore, the first detection unit 44 stores, for each of the player and professional golfer, the images of the seven specific swing states detected in the RAM 13.

The face detection unit 45 detects an image of a face portion of each of the player and professional golfer (hereinafter, referred to as "face image") for each of the seven specific swing states detected by the first detection unit 44. With a face detection unit (not illustrated) being provided, the detection of the face image is executed based on an output from the face detection unit.

Figure 3:
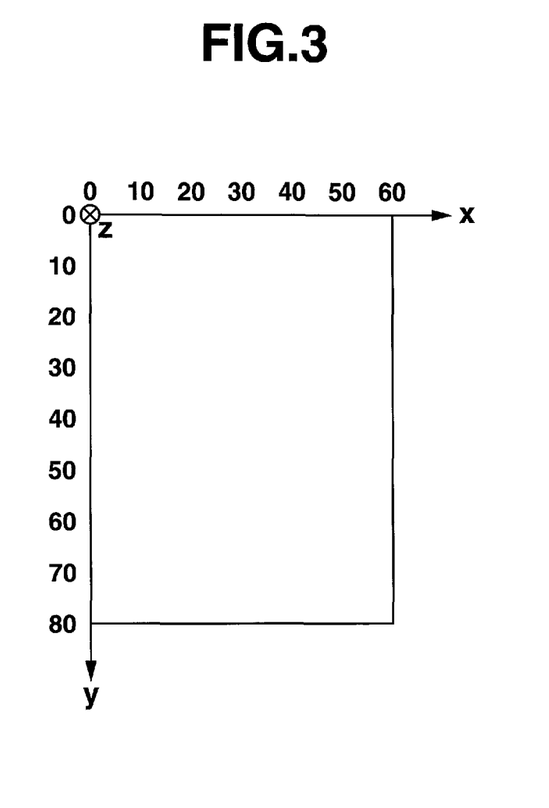
FIG. 3 is a diagram showing a coordinate system of a captured image.

The second detection unit 46 detects a position coordinate of the face image, which is detected by the face detection unit 45, in a captured image for each of the seven specific swing state images. More specifically, the second detection unit 46 detects a position coordinate of the face image in a coordinate system of a captured image shown in FIG. 3. FIG. 3 is a diagram showing a coordinate system of a captured image. A coordinate of a captured image can be defined as a coordinate on an X-Y plane. However, in FIG. 3, the Z-axis is shown for the purpose of convenience in order to define a tilt of a face in a right-left direction described later.

FIG. 4 is a diagram showing positions and the like of face images for the player and the professional golfer for each of the seven specific swing state images. The position coordinate of the face image detected is represented with the parameter "c" of FIG. 4. For example, in the "address" state of the professional golfer in FIG. 4, it is shown that the position coordinate is X=33 and Y=18.

It should be noted that the second detection unit 46 associates the position coordinate of the face image detected with each of the seven specific swing state images and stores the data in the RAM 13.

Furthermore, the second detection unit 46 detects the tilt of a face in the right-left direction, the tilt of the face in the up-down direction, and the tilt of the face in the rotational direction, for each of the player and professional golfer, based on the face images thus detected. Here, the vector in the front direction of the face and the Z-axis is parallel, the tilts of the right-left direction and the up-down direction of the face are zero degrees. With this case as a reference, the tilt in the right-left direction of the face is represented by a rotational angle around the Y-axis of a projection vector onto the Z-X plane of the vector in the front direction of the face, and the tilt in the up-down direction of the face is represented by a rotational angle around the X-axis of a projection vector onto the Y-Z plane of the vector in the front direction of the face.

Furthermore, when the vector in the front direction of the face is parallel with the Y-axis, the tilt of the face is zero degrees. With this case as a reference, the tilt of the face is represented by a rotational angle around the Z-axis of a projection vector onto the X-Y plane of the vector in the front direction of the face.

The right-left orientation of the face and the up-down tilt of the face thus detected are represented with the parameter "a" in FIG. 4. For example, in the "halfway back" state of the professional golfer in FIG. 4, it is shown that the face tilts 5 degrees in the right direction and 33 degrees in the lower direction.

Furthermore, the tilt of the face in the rotational direction thus detected is represented with the parameter "b" in FIG. 4. For example, in the "top" state of the professional golfer in FIG. 4, it is shown that the tilt of the face is 11 degrees.

It should be noted that the second detection unit 46 associates the tilt of the face in the right-left direction detected, the tilt of the face in the up-down direction detected, and the tilt of the face in the rotational direction detected with each of the seven specific swing state images, and stores the data in the RAM 13.

Furthermore, the second detection unit 46 detects the size of a face image and a position coordinate of an image of a golf ball (hereinafter, referred to as "golf ball image") in a captured image. The size of a face image is detected as an area of a face image in a captured image. With a golf ball detection unit (not illustrated) being provided, the detection of a position of a golf ball image in a captured image is executed based on an output from the golf ball detection unit.

The size of a face image thus detected is represented with the parameter "d" in FIG. 4. For example, in a case of the professional golfer of FIG. 4, it is shown that the size of the face image is 9.5.

Furthermore, the position coordinate of the golf ball image thus detected is represented with the parameter "e" in FIG. 4. For example, in a case of the professional golfer of FIG. 4, it is shown that the position of the golf ball image is X=38 and Y=78.

It should be noted that the second detection unit 46 stores the size of the face image and the position coordinate of the golf ball image in the captured image for each of the player and the professional golfer in the RAM 13.

The comparison unit 47 compares, between the player and the professional golfer, each value of the position coordinate of the face image, the tilts of the face in the right-left direction, the tilts of the face in the up-down direction, and the tilts of the face in the rotational direction, detected by the second detection unit 46, and calculates the differences.

The advice information generation unit 48 generates advice information based on each of the difference values, which is a comparison result by the comparison unit 47. The advice information refers to character information notified to the player. The contents of the advice information include information based on the difference values of the position of the face image between the player and the professional golfer, i.e. a message such as "Move your head 15 cm lower and 15 cm to the right" shown in FIG. 5. Furthermore, the advice information generation unit 48 associates the advice information generated with the player's swing state as "position advice information" and stores the data in the RAM 13.

Figure 6:
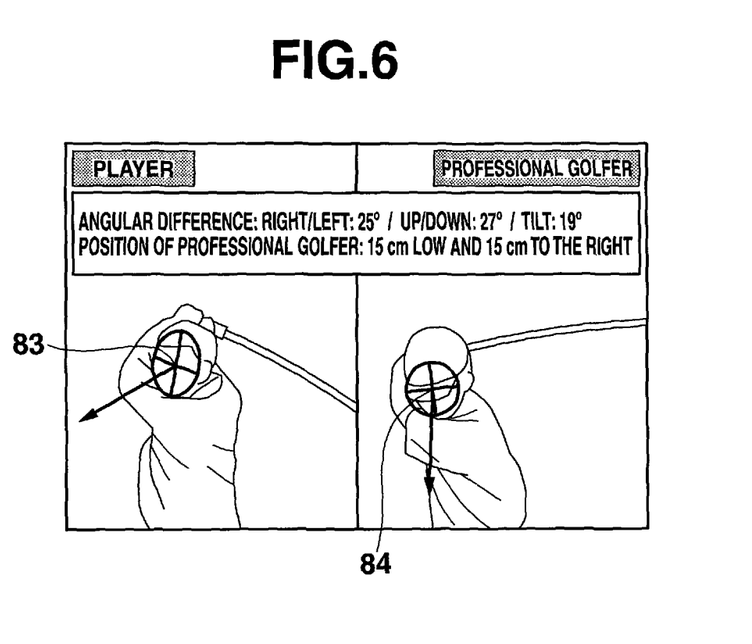
FIG. 6 is a diagram showing an example of a notification image.

Furthermore, the contents of the advice information in another aspect include information based on each difference value of the position coordinates of the face image, the tilts of the face in the right-left direction, the tilts of the face in the up-down direction, the tilts of the face in the rotational direction, between the player and the professional player, i.e. a message such as "Angle Difference: right/left: 25 degrees, up/down: 27 degrees, tilt: 19 degree, professional golfer position: 15 cm lower and 15 cm to the right" shown in FIG. 6. Furthermore, the advice information generation unit 48 associates the advice information thus generated with the player's swing state as "advice information relating to position and angle difference" and stores the data in the RAM 13.

Figure 7:
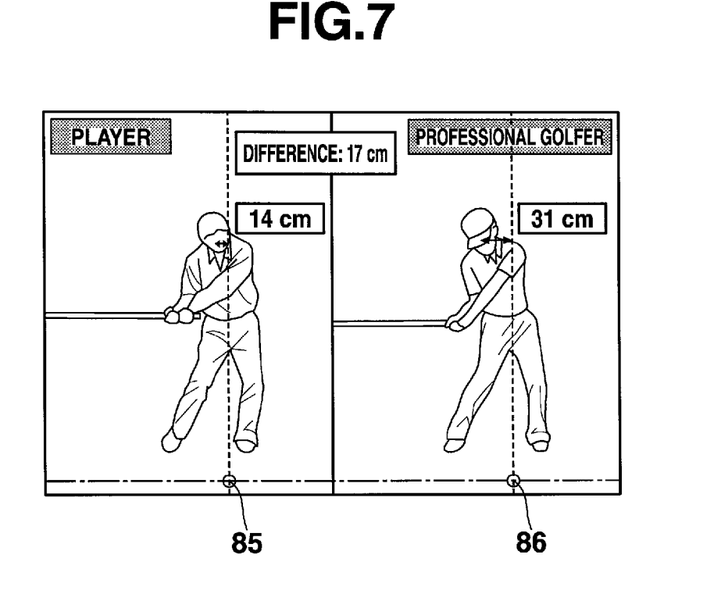
FIG. 7 is a diagram showing an example of a notification image.

Furthermore, the contents of the advice information in another aspect are "14 cm" which is a difference value between the X coordinate of the golf ball image 85 and the X coordinate of the player's face image, "31 cm" which is a difference value between the X coordinate of the golf ball image 86 and the X coordinate of the professional golfer's face image; and a "difference: 17 cm" that is information based on the difference between these difference values, as shown in FIG. 7, for example. Moreover, the advice information generation unit 48 associates the advice information thus generated with the player's swing state as "advice information relating to difference between balls" and stores the data in the RAM 13.

Figure 9:
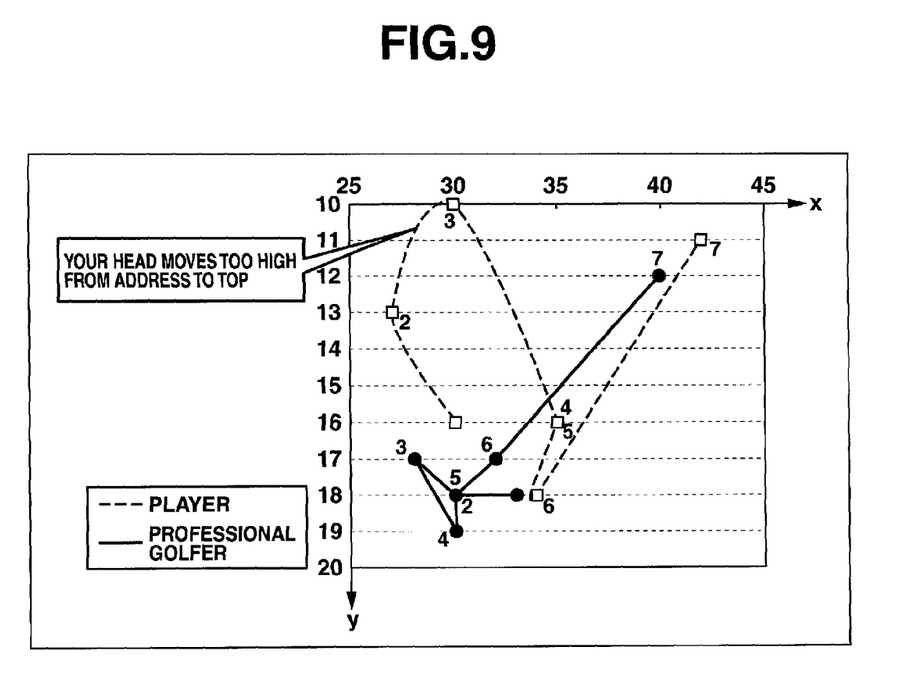
FIG. 9 is a diagram showing an example of a notification image.

Furthermore, the contents of the advice information in another aspect include information based on transitions of the position coordinates of the player's face image for each swing state, i.e. the message such as "Your head moves too high from address to top" shown in FIG. 9, for example. Furthermore, the advice information generation unit 48 stores the advice information thus generated in the RAM 13 as "graph advice information".

The notification image generation unit 49 generates the data of a notification image based on advice information generated by the advice information generation unit 48, the seven specific swing state images for each of the player and the professional golfer detected by the first detection unit 44, and the position coordinate of the face image, the tilt of the face in the right-left direction, the tilt of the face in the up-down direction, the tilt of the face in the rotational direction, and the position coordinate of the golf ball image, detected by the second detection unit 46.

Figure 5:
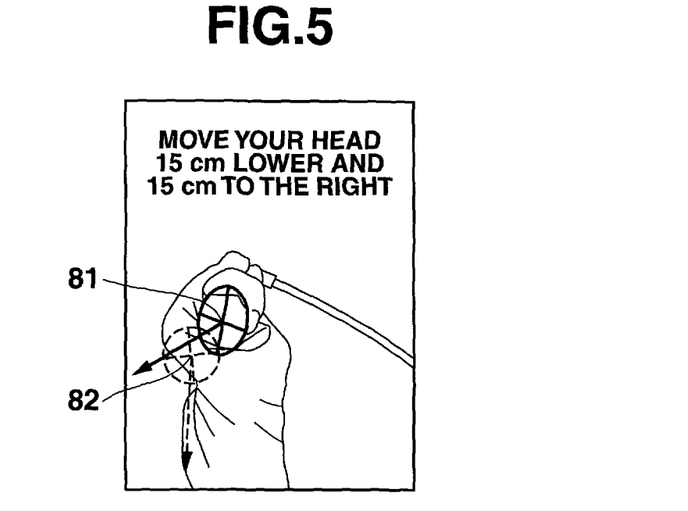
FIG. 5 is a diagram showing an example of a notification image.

For example, when the data of the notification image shown in FIG. 5 is generated, the notification image generation unit 49 extracts, from the RAM 13, data of an image in the "top" state of the player detected by the first detection unit 44 and extracts, from the RAM 13, "position advice information" of the player's "top" state. Furthermore, the notification image generation unit 49 generates each piece of data of a mark image 81 representing the position of the face image and the front direction of the face of the player and a mark image 82 representing the position of the face image and the front direction of the face of the professional golfer, based on the position coordinate of the face image, the tilt of the face in the right-left direction, and the tilt of the face in the up-down direction, detected by the second detection unit 46. Then, the notification image generation unit 49 generates, as the data of the notification image shown in FIG. 5, image data including an image of the player's "top" state in which the mark image 81 is superimposed on the player's face image, the "position advice information" stored to be associated with the player's "top" state extracted from the RAM 13, and the mark images 81 and 82.

Furthermore, for example, when the data of the notification image shown in FIG. 6 is generated, the notification image generation unit 49 extracts, from the RAM 13, the data of the "top" state images of the player and the professional golfer detected by the first detection unit 44 and extracts, from the RAM 13, "advice information relating to position and angle difference" of the player's "top" state. Furthermore, the notification image generation unit 49 generates each piece of data of a mark image 83 representing the position of the face image and the front direction of the face of the player and a mark image 84 representing the position of the face image and the front direction of the face of the professional golfer, based on the position coordinate of the face image, the tilt of the right-left direction of the face, and the tilt of the up-down direction of the face, detected by the second detection unit 46. Then, the notification image generation unit 49 generates, as data of a left half region of the notification image shown in FIG. 6, image data including the mark image 83 and the player's "top" state image in which the mark image 83 is superimposed on the face image of the player. Furthermore, the notification image generation unit 49 generates, as data of the right half region of the notification image shown in FIG. 6, image data including the mark image 84 and the professional golfer's "top" state image in which the mark image 84 is superimposed on the face image of the professional golfer. Moreover, the notification image generation unit 49 combines the "advice information relating to position and angle difference" stored to be associated with the player's "top" state extracted from the RAM 13, the data of the left half region of the notification image, and the data of the right half region of the notification image to generate the notification image data shown in FIG. 6.

Furthermore, for example, when the notification image data shown in FIG. 7 is generated, the notification image generation unit 49 extracts, from the RAM 13, "halfway down" state images of the player and the professional golfer detected by the first detection unit 44 and extracts, from the RAM 13, "advice information relating to difference between balls" in the player's "halfway down" state. Furthermore, the notification image generation unit 49 generates, as data of a left half region of the notification image shown in FIG. 7, image data including a difference value between the X coordinate of a golf ball image included in the "advice information relating to difference between balls" stored by being associated with the player's "halfway down" state extracted from the RAM 13 and the X coordinate of the player's face image (hereinafter, referred to as "first coordinate difference value") and an image of the player's "halfway down" state. Furthermore, the notification image generation unit 49 generates, as data of a right half region of the notification image shown in FIG. 7, the difference value between the X coordinate of the golf ball image included in the "advice information relating to difference between balls" and X coordinate of the face image of the professional golfer (hereinafter, referred to as "second coordinate difference value") and an image of the professional "halfway down" state. Furthermore, the notification image generation unit 49 combines a difference value between the first coordinate difference value and the second coordinate difference value, the data of the left half region of the notification image, and the data of the right half region of the notification image to generate the notification image data shown in FIG. 7.

Figure 8:
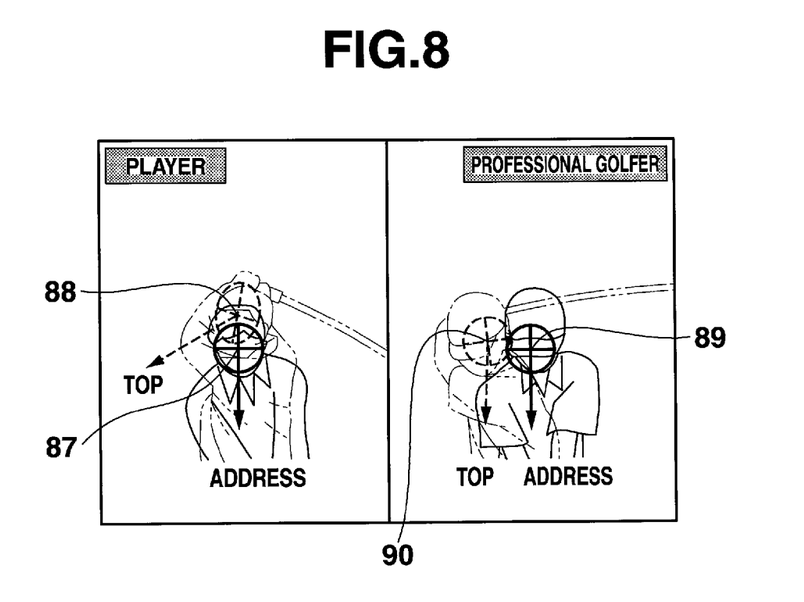
FIG. 8 is a diagram showing an example of a notification image.

Furthermore, for example, when the notification image data shown in FIG. 8 is generated, the notification image generation unit 49 extracts, from the RAM 13, image data of the "top" and "address" states for each of the player and the professional golfer, detected by the first detection unit 44. Furthermore, the notification image generation unit 49 generates a mark image 87 representing the position of the face image and the front direction of the face in the player's "address" state, a mark image 88 representing the position of the face image and the front direction of the face in the player's "top" state, a mark image 89 representing the position of the face image and the front direction of the face in the professional golfer's "top" state, and a mark image 90 representing the position of the face image and the front direction of the face in the professional golfer's "top" state, based on the position coordinate of the face image, the tilt of the face in the right-left direction, and the tilt of the face in the up-down direction, detected by the second detection unit 46.

Then, the notification image generation unit 49 superimposes the mark image 87 onto the face image in the player's "address" state and superimposes the mark image 88 onto the face image in the player's "top" state to generate data of an image including the mark images 87 and 88 and the player's "address" and "top" states as data of the left half region of the notification image shown in FIG. 8. In addition, the notification image generation unit 49 superimposes the mark image 89 onto the face image in the professional golfer's "address" state and superimposes the mark image 90 onto the professional golfer's "top" state to generate data of an image including the marks 89 and 90 and the professional golfer's "address" and "top" states as data of the right half region of the notification image shown in FIG. 8. Furthermore, the notification image generation unit 49 combines the data of the left half region of the notification image with the data of the right half region of the notification image to generate the notification image data shown in FIG. 8.

Furthermore, for example, when the notification image data shown in FIG. 9 is generated, the notification image generation unit 49 reads position coordinates of the player's and the professional golfer's face images in the seven specific swing states which are detected by the second detection unit 46 and stored in the RAM 13. Furthermore, the notification image generation unit 49 extracts the player's "advice information relating to graph" from the RAM 13. Then, the notification image generation unit 49 generates graphs for the transitions of the position coordinates for both the player and the professional golfer based on the position coordinates thus read and generates data of the graphs and the message of "advice information relating to graph" as the notification image shown data in FIG. 9.

It should be noted that the notification image data generated by the notification image generation unit 49 is stored in the RAM 13.

The notification control unit 50 outputs to display on the output unit 18 the notification image data generated by the notification image generation unit 49. Here, the notification control unit 50 selects the notification image data that is generated by the notification image generation unit 49 in response to an input operation by a user via the input unit 17 and stored in the RAM 13, and outputs to display the data on the output unit 18.

Notification Processing

Next, notification processing executed by the information notification apparatus 1 is described.

Figure 10:
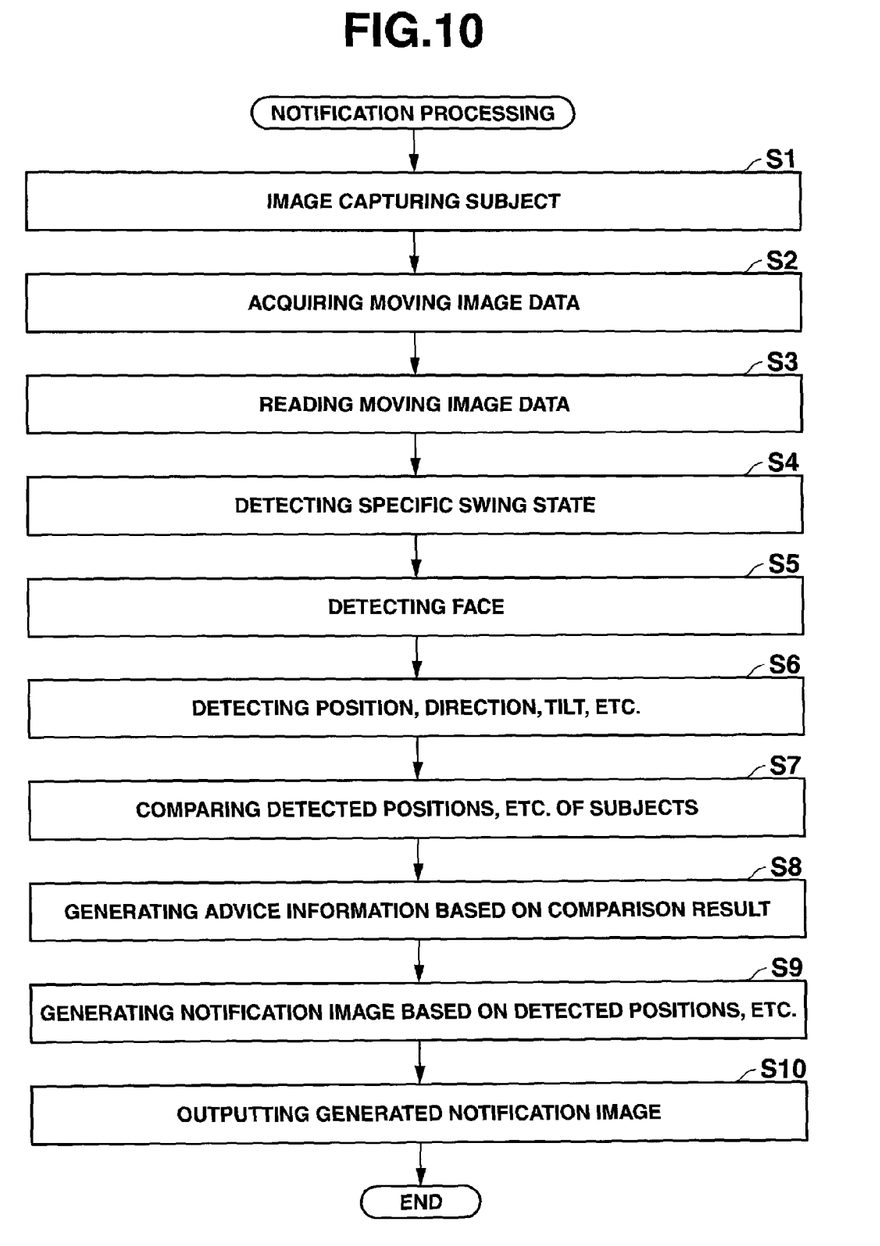
FIG. 10 is a flowchart showing an example of a flow of comparison result notification processing executed by the information notification apparatus 1 of FIG. 1 having the functional configuration of FIG. 2.

FIG. 10 is a flowchart showing an example of a flow of notification processing executed by the information notification apparatus 1 of FIG. 1 having the functional configuration of FIG. 2.

In FIG. 10, when the input unit 17 of the information notification apparatus 1 is operated for starting capturing an image of a subject, the processing of Steps S1 to S10 is executed.

In Step S1, the image capture control unit 41 causes the image capture unit 16 to continuously capture a subject (a player) and output the image data of the subject as moving image data.

In Step S2, the image acquisition unit 42 acquires moving image data output from the image capture unit 16. Then, the image acquisition unit 42 encodes the moving image data and stores it in the first image storage unit 61.

In Step S3, the image reading unit 43 reads moving image data of the player stored in the first image storage unit 61 and moving image data of the professional golfer stored in advance in the second image storage unit 62. In other words, the image reading unit 43 sequentially decodes the moving image data stored in the first image storage unit 61 and the second image storage unit 62 with each captured image as a unit and stores a sequence of data of the captured images in the RAM 13.

In Step S4, the first detection unit 44 detects, for each of the player and the professional golfer, a specific swing state image based on the moving image data of the player and the moving image data of the professional golfer that is read in Step S3. Here, the specific swing state refers to the seven states of the "address" state, "halfway back" state, "halfway down" state, "top" state, "impact" state, "follow" state, and "finish" state, as shown in FIG. 4 described later. Furthermore, the first detection unit 44 stores the seven specific swing state images thus detected in the RAM 13 for each of the player and the professional golfer.

In Step S5, the face detection unit 45 detects face images of each of the player and the professional golfer for each of the seven specific swing state images detected in Step S4.

In Step S6, the second detection unit 46 detects position coordinates in the captured images of the face images detected in Step S5 for each of the seven specific swing state images. Furthermore, the second detection unit 46 detects, for each of the player and the professional golfer, the tilt of the face in the right-left direction, the tilt of the face in the up-down direction, and the tilt of the face in the rotational direction, based on the face images detected in Step S5. Furthermore, the second detection unit 46 associates the position coordinates of the face images, the tilt of the face in the right-left direction, the tilt of the face in the up-down direction, and the tilt of the face in the rotational direction detected with the seven specific swing state images and stores the data in the RAM 13.

Furthermore, in Step S6, the second detection unit 46 detects the size of the face image and a position coordinate of a golf ball image in the captured image. It should be noted that the second detection unit 46 stores the size of the face image and the position coordinate of the golf ball image in the captured image in the RAM 13 for each of the player and the professional golfer.

In Step S7, the comparison unit 47 compares, between the player and the professional golfer, the tilts of the face in the right-left direction, the tilts of the face in the up-down direction, and the tilts of the face in the rotational direction, detected by the second detection unit 46, and calculates the differences.

In Step S8, the advice information generation unit 48 generates advice information based on each of the difference values (the abovementioned "position advice information" and the like), which is the comparison result in Step S7. Furthermore, the advice information generation unit 48 associates the "position advice information", the "advice information relating to position and angle difference" and the "advice information relating to difference in balls" thus generated with the player's swing state and stores the data in the RAM 13. Furthermore, the advice information generation unit 48 stores the "advice information relating to graph" thus generated in the RAM 13.

In Step S9, the notification image generation unit 49 generates the notification image data shown in FIGS. 5 to 9 based on the advice information generated in Step S8, the seven specific swing state images for each of the player and the professional golfer detected in Step S4, and the position coordinates of the face images, the tilts of the faces in the right-left direction, the tilts of the faces in the up-down direction, the tilts of the faces in the rotational direction, and the position coordinates of the golf ball images, which are detected in Step S6. Furthermore, the notification image generation unit 49 stores the notification image data thus generated in the RAM 13.

In Step S10, the notification control unit 50 outputs to display on the output unit 18 the notification image data generated by the notification image generation unit 49. Here, the notification control unit 50 selects the notification image data that is generated by the notification image generation unit 49 in response to an input operation by a user via the input unit 17 and stored in the RAM 13, and outputs to display the data on the output unit 18.

Embodiments of the present invention are described above.

The information notification apparatus 1 executing the abovementioned notification processing includes the image acquisition unit 42, the first detection unit 44, the face detection unit 45, the comparison unit 47, and the notification control unit 50.

The image acquisition unit 42 acquires a plurality of moving images in which the motions of the subjects are captured, respectively.

The first detection unit 44 detects specific swing states of the motion of the subjects from respective moving images among the plurality of acquired moving images.

The face detection unit 45 detects images corresponding to the respective detected specific swing states from the moving images.

The comparison unit 47 compares the detected images.

The notification control unit 50 notifies information based on a comparison result by the comparison unit 47.

Therefore, information based on a comparison result between an image of the player and an image of the professional golfer in a specific swing state after the swing motion of the player, for example, information of a comparison result of a position of a face image, is notified. Consequently, it is possible to easily recognize the difference between the player and the professional golfer as subjects in the specific swing states even not during the golf swing.

The first detection unit 44 detects a plurality of types of specific states from respective moving images among the plurality of moving images.

The face detection unit 45 detects a plurality of images corresponding to the plurality of types of respective detected specific states.

The comparison unit 47 compares a plurality of detected images.

Therefore, it is possible to easily recognize the difference between the player and the professional golfer as subjects in the plurality of specific swing states even not during the golf swing.

The face detection unit 45 detects partial images of subjects from images corresponding to the respective detected specific states.

The comparison unit 47 compares the detected partial images.

Therefore, information based on a comparison result between an image of the player and an image of the professional golfer in a specific swing state after the swing motion of the player, for example, information of a comparison result of a position of a face image, is notified. Consequently, it is possible to easily recognize the difference between the player and the professional golfer as subjects in the specific swing states even not during the golf swing.

Furthermore, the information notification apparatus 1 includes the second detection unit 46.

The second detection unit 46 detects positions or directions of the detected partial images.

The comparison unit 47 compares the positions or the directions.

Therefore, it is possible to easily recognize the difference of the position or the tilt of the face between the player and the professional golfer as subjects in the specific swing states even not during the golf swing.

Furthermore, the information notification apparatus 1 includes the notification image generation unit 49.

The notification image generation unit 49 generates notification image corresponding to the comparison result of the comparison unit.

Furthermore, the notification control unit 50 notifies notification information of the comparison result with respect to the positions or the directions, and/or a notification image indicative of the positions or the directions.

Therefore, it is possible to easily recognize the difference in the position or the tilt of the face between the player and the professional golfer as subjects in a plurality of the specific swing states even not during the golf swing, and furthermore, it is possible to recognize specifically the difference in the position nor the tilt of the face based on the advice information, and it is also possible to visually recognize the position or the tilt of the face based on the mark images.

It should be noted that the present invention is not to be limited to the aforementioned embodiment, and that modifications, improvements, etc. within a scope that can achieve the object of the present invention are also included in the present invention.

Figure 11:
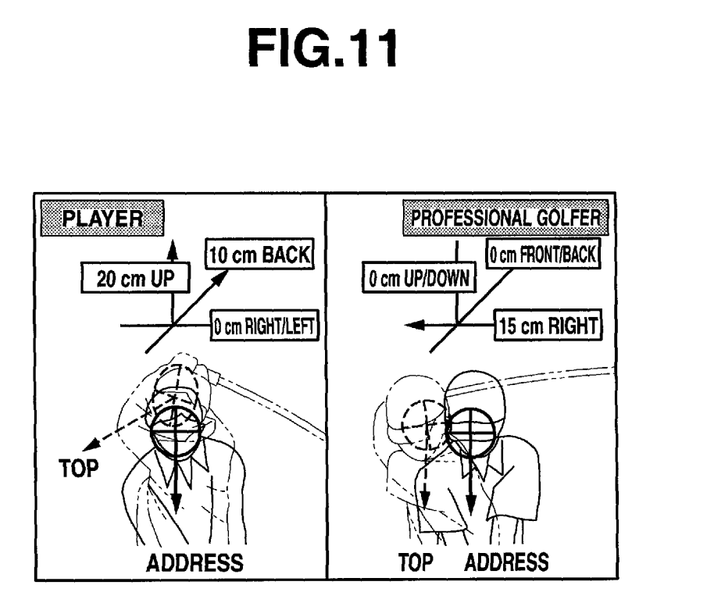
FIG. 11 is a diagram showing an example of a notification image.

In the abovementioned embodiment, although there is one information notification apparatus 1, the present invention is not limited thereto, and two information notification apparatuses 1 may be provided so as to photograph a subject from multiple-view points. With such a configuration, as shown in FIG. 11, a notification image from which the difference in the front-back direction can be recognized in a comparison result between two specific swing states may be notified.

Furthermore, in the abovementioned embodiment, although the positions of the face images of the player and the professional golfer are detected, the present invention is not limited thereto. For example, a position of an image other than the face, such as an arm and a leg, may be detected.

Furthermore, in the abovementioned embodiment, although the seven states such as the "address" state for specific swing states are specified, the present invention is not limited thereto, and other states may be detected. Furthermore, the number of specific swing states may be equal to or less than six or at least eight.

Furthermore, although the cases of applying the present invention are described with the data of a moving image in which the swing of a golf club is photographed as a target in the abovementioned embodiments, for example, the present invention can be applied for comparison of various actions. For example, the present invention can be applied for comparison of motions of various sports such as the swing of a baseball bat, the swing of a tennis racket, choreography, and the like.

Furthermore, the present invention can be applied for comparison of various motions such as music performance, cooking (knife cuts, handling a pan, etc.), magic tricks, pottery making, events for the Skill Olympic and Abilympic, etc.

In the aforementioned embodiments, a digital camera has been described as an example of the information notification apparatus 1 to which the present invention is applied; however, the present invention is not particularly limited thereto.

For example, the present invention can be applied to any electronic device in general having an image processing function. More specifically, for example, the present invention can be applied to a lap-top personal computer, a printer, a television, a video camera, a portable navigation device, a cell phone device, a portable gaming device, and the like.

The processing sequence described above can be executed by hardware, and can also be executed by software.

In other words, the hardware configuration shown in FIG. 2 is merely an illustrative example, and the present invention is not particularly limited thereto. More specifically, the types of functional blocks employed to realize the above-described functions are not particularly limited to the example shown in FIG. 2, so long as the information notification apparatus 1 can be provided with the functions enabling the aforementioned processing sequence to be executed in its entirety.

A single functional block may be configured by a single piece of hardware, a single installation of software, or any combination thereof.

In a case in which the processing sequence is executed by software, a program configuring the software is installed from a network or a storage medium into a computer or the like.

The computer may be a computer embedded in dedicated hardware. Alternatively, the computer may be a computer capable of executing various functions by installing various programs, e.g., a general-purpose personal computer.

The storage medium containing such a program can not only be constituted by the removable medium 31 shown in FIG. 1 distributed separately from the device main body for supplying the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), or the like. The magnetic optical disk is composed of an MD (Mini-Disk) or the like. The storage medium supplied to the user in a state incorporated in the device main body in advance may include, for example, the ROM 12 shown in FIG. 1, a hard disk included in the storage unit 19 shown in FIG. 1 or the like, in which the program is recorded.

It should be noted that, in the present specification, the steps describing the program recorded in the storage medium include not only the processing executed in a time series following this order, but also processing executed in parallel or individually, which is not necessarily executed in a time series.

Although some embodiments of the present invention have been described above, the embodiments are merely exemplification, and do not limit the technical scope of the present invention. Other various embodiments can be employed for the present invention, and various modifications such as omission and replacement are possible without departing from the sprits of the present invention. Such embodiments and modifications are included in the scope of the invention and the summary described in the present specification, and are included in the invention recited in the claims as well as the equivalent scope thereof.

What is claimed is:

1. An information notification apparatus comprising:
   a processor which is configured to:
   acquire a first moving image comprising a plurality of first images in which motion of a first object is captured, and a second moving image comprising a plurality of second images in which motion of a second object is captured, wherein the first images show the first object in a plurality of postures as the first object moves through the motion captured in the first moving image, and the second images show the second object in a plurality of postures as the second object moves through the motion captured in the second moving image, wherein the first object is different from the second object;
   specify a specific posture from among the plurality of postures;
   detect an image among the first images corresponding to the specified specific posture, and detect an image among the second images corresponding to the specified specific posture; and
   notify information corresponding to difference values between the detected image from among the first images and the detected image from among the second images;
   wherein the processor is configured to calculate, as the difference values, a difference value of a tilt angle and position coordinates of a human face of each object captured in each detected image corresponding to the specified specific posture;
   wherein the processor is configured to calculate, as the tilt angle, at least one of tilts of the face in a right-left direction, tilts of the face in an up-down direction, and tilts of the face in a rotational direction; and
   wherein the processor is configured to notify, as the information, advice information about a head position and a head direction corresponding to the difference values between each detected image corresponding to the specified specific posture.

2. The information notification apparatus according to claim 1, wherein the processor is further configured to:
   store, in a storage, a plurality of types of pieces of information corresponding to a plurality of types of specific postures, as information based on the difference values, and select the information based on the difference values from the plurality of types of pieces of information, and notify the selected information.

3. The information notification apparatus according to claim 1, wherein the processor is further configured to:
   specify a plurality of specific postures from among the plurality of postures, detect a plurality of images among the first images corresponding to the plurality of specified specific postures, respectively, and detect a plurality of images among the second images corresponding to the plurality of specified specific postures, respectively; and
   calculate the difference values between (i) the plurality of detected images from the first images and (ii) corresponding ones of the plurality of detected images from the second images, respectively.

4. The information notification apparatus according to claim 1, wherein the processor is further configured to:
   specify a plurality of specific postures from among the plurality of postures, and detect partial images of the first object from the first images corresponding to the respective specified specific postures, and partial images of the second object from the second images corresponding to the respective specified specific postures, and calculate, as the difference values, difference values between (i) one of the detected partial images of the first object and (ii) a corresponding one of the detected partial images of the second object.

5. The information notification apparatus according to claim 4, wherein the processor is further configured to:
   detect positions and directions of the detected partial images, and calculate, as the difference values, difference values between the positions and the directions.

6. The information notification apparatus according to claim 5, the processor is further configured to:
   calculate the difference values between the detected image from the first images and the detected image from the second images;

generate a notification image corresponding to the calculated difference values; and notify notification information of the difference values with respect to the positions and the directions, and/or the notification image indicative of the positions and the directions.

7. The information notification apparatus according to claim 3, wherein the processor is further configured to generate a first composite image formed by combining detected images among the first images corresponding to the plurality of specified specific postures, and a second composite image formed by combining detected images among the second images corresponding to the plurality of specified specific postures.

8. The information notification apparatus according to claim 7, wherein the processor is configured to generate the first composite image and the second composite image so that postures other than a predetermined posture are transparent relative to the predetermined posture.

9. A method executed by an information notification apparatus, the method comprising:

acquiring a first moving image comprising a plurality of first images in which motion of a first object is captured, and a second moving image comprising a plurality of second images in which motion of a second object is captured, wherein the first images show the first object in a plurality of postures as the first object moves through the motion captured in the first moving image, and the second images show the second object in a plurality of postures as the second object moves through the motion captured in the second moving image, wherein the first object is different from the second object;

specifying a specific posture from among the plurality of postures;

detecting an image among the first images corresponding to the specified specific posture, and detecting an image among the second images corresponding to the specified specific posture; and notifying information corresponding to difference values between the detected image from among the first images and the detected image from among the second images;

wherein the method further comprises:

calculating, as the difference values, a difference value of a tilt angle and position coordinates of a human face of each object captured in each detected image corresponding to the specified specific posture;

calculating, as the tilt angle, at least one of tilts of the face in a right-left direction, tilts of the face in an up-down direction, and tilts of the face in a rotational direction; and notifying, as the information, advice information about a head position and a head direction corresponding to the difference values between each detected image corresponding to the specified specific posture.

10. A non-transitory computer-readable storage medium having stored thereon a computer-readable program that is executable by a computer to cause the computer to perform functions comprising:

acquiring a first moving image comprising a plurality of first images in which motion of a first object is captured, and a second moving image comprising a plurality of second images in which motion of a second object is captured, wherein the first images show the first object in a plurality of postures as the first object moves through the motion captured in the first moving image, and the second images show the second object in a plurality of postures as the second object moves through the motion captured in the second moving image, wherein the first object is different from the second object;

specifying a specific posture from among the plurality of postures;

detecting an image among the first images corresponding to the specified specific posture, and detecting an image among the second images corresponding to the specified specific posture; and notifying information corresponding to difference values between the detected image from among the first images and the detected image from among the second images;

wherein the functions further comprise:

calculating, as the difference values, a difference value of a tilt angle and position coordinates of a human face of each object captured in each detected image corresponding to the specified specific posture;

calculating, as the tilt angle, at least one of tilts of the face in a right-left direction, tilts of the face in an up-down direction, and tilts of the face in a rotational direction; and notifying, as the information, advice information about a head position and a head direction corresponding to the difference values between each detected image corresponding to the specified specific posture.

11. The information notification apparatus according to claim 1, wherein the processor notifies the information as text displayed on a display.

12. The information notification apparatus according to claim 1, wherein the processor is configured to generate the advice information as an image corresponding to the difference values, and to notify the image as the advice information.

13. The information notification apparatus according to claim 1, wherein the processor is configured to:

generate an indicator based on the calculated difference values; and notify notification information of the difference values as the indicator displayed on the detected image, wherein the indicator indicates the calculated difference values.

14. The information notification apparatus according to claim 1, wherein the processor is configured to:

notify notification information corresponding to the calculated difference values, in text form.

15. The information notification apparatus according to claim 1, wherein the first object is a first player and the second object is a second player different from the first player.

16. The information notification apparatus according to claim 1, wherein the processor is configured to:

calculate, as the difference values, difference values between (i) the first object in the detected image from among the first images and (ii) the second object in the detected image from among the second images; and notify the difference values in text form.

17. The information notification apparatus according to claim 1, wherein the processor is configured to:

control a display to display (i) an image corresponding to the information, (ii) the detected image from among the first images and (iii) the detected image from among the second images.

18. The information notification apparatus according to claim 1, wherein the processor is configured to:

detect an image corresponding to a timing of the specified specific posture of the first object from among the first images, and detect an image corresponding to a timing of the specified specific posture of the second object from among the second images; and notify information corresponding to the difference values between the detected image from among the first images and the detected image from among the second images.

19. The information notification apparatus according to claim 1, wherein the processor is configured to calculate, as the tilt angle, tilts of the face in the right-left direction, tilts of the face in the up-down direction, and tilts of the face in the rotational direction.

\* \* \* \* \*